(12) United States Patent
Gray

(10) Patent No.: US 6,198,643 B1
(45) Date of Patent: Mar. 6, 2001

(54) SYSTEM WITH CHOKE IN PARALLEL WITH A/C POWER LINE FOR LOAD CONDITIONING

(75) Inventor: Richard Gray, New Orleans, LA (US)

(73) Assignee: Audio Line Source, LLC, New Orleans, LA (US)

( * ) Notice: Subject to any disclaimer, the term of this patent is extended or adjusted under 35 U.S.C. 154(b) by 0 days.

(21) Appl. No.: 09/274,149

(22) Filed: Mar. 22, 1999

Related U.S. Application Data

(60) Provisional application No. 60/109,337, filed on Nov. 20, 1998.

(51) Int. Cl.[7] ............................. H02M 1/00; H02M 1/12; H01H 47/00
(52) U.S. Cl. ............................. 363/39; 363/146; 361/159
(58) Field of Search ..................... 363/39, 50, 142, 363/146; 361/118, 159

(56) References Cited

U.S. PATENT DOCUMENTS

| | | |
|---|---|---|
| 4,218,660 | 8/1980 | Carver . |
| 4,445,095 | 4/1984 | Carver . |
| 4,484,150 | 11/1984 | Carver . |
| 4,517,528 | 5/1985 | Tanaka et al. . |
| 4,586,002 | 4/1986 | Carver . |
| 4,594,561 | 6/1986 | Grodinsky et al. . |
| 4,769,615 | 9/1988 | Liberman . |
| 4,808,946 | 2/1989 | Carver . |
| 5,164,991 | 11/1992 | Johnson et al. . |
| 5,260,862 | * 11/1993 | Marsh ................................. 363/39 |
| 5,297,015 | * 3/1994 | Miyazaki et al. ............... 363/146 |

* cited by examiner

Primary Examiner—Jessica Han
(74) Attorney, Agent, or Firm—Pugh / Associates; C. Emmett Pugh

(57) ABSTRACT

A choke coil [e.g exceeding about three (3) henries] placed in parallel with the A/C line, that is, preferably across the A/C line's "hot" and "common" lines, quenching the reflected signal (or back emf) that is developed when any power amplifier or other load places it's demands upon the incoming A/C power line. Due to its electromagnetic characteristics, the choke tends to provide a momentary high current source of energy when needed by, e.g., a power amplifier (or other appropriate load) when transient demand is called for. The invention's parallel choke approach, due to the fact that it must be magnetically charged by electricity [either from the A/C line or back electromotive force (emf) from it's load] tends to have a reversing effect on this signal, preventing, eliminating or at least substantially reducing it's presence on the A/C line, thereby providing a greatly enhanced A/C power line signal quality for the load. Without this choke, the otherwise untreated signals are able to modulate the A/C line, as it is resistive (basically a wire going from the utility services transformer to the wall outlet into which the load(s) is/are plugged). Exemplary applications include A/C operated, electric or electronic equipment, preferably, e.g., audio power amplifiers and preamplifiers, televisions, computers, computer peripherals, and other such electronic component equipment or other electrical equipment or devices, for example, electrical motors, air conditioners and other major and minor appliances, etc.

9 Claims, 5 Drawing Sheets

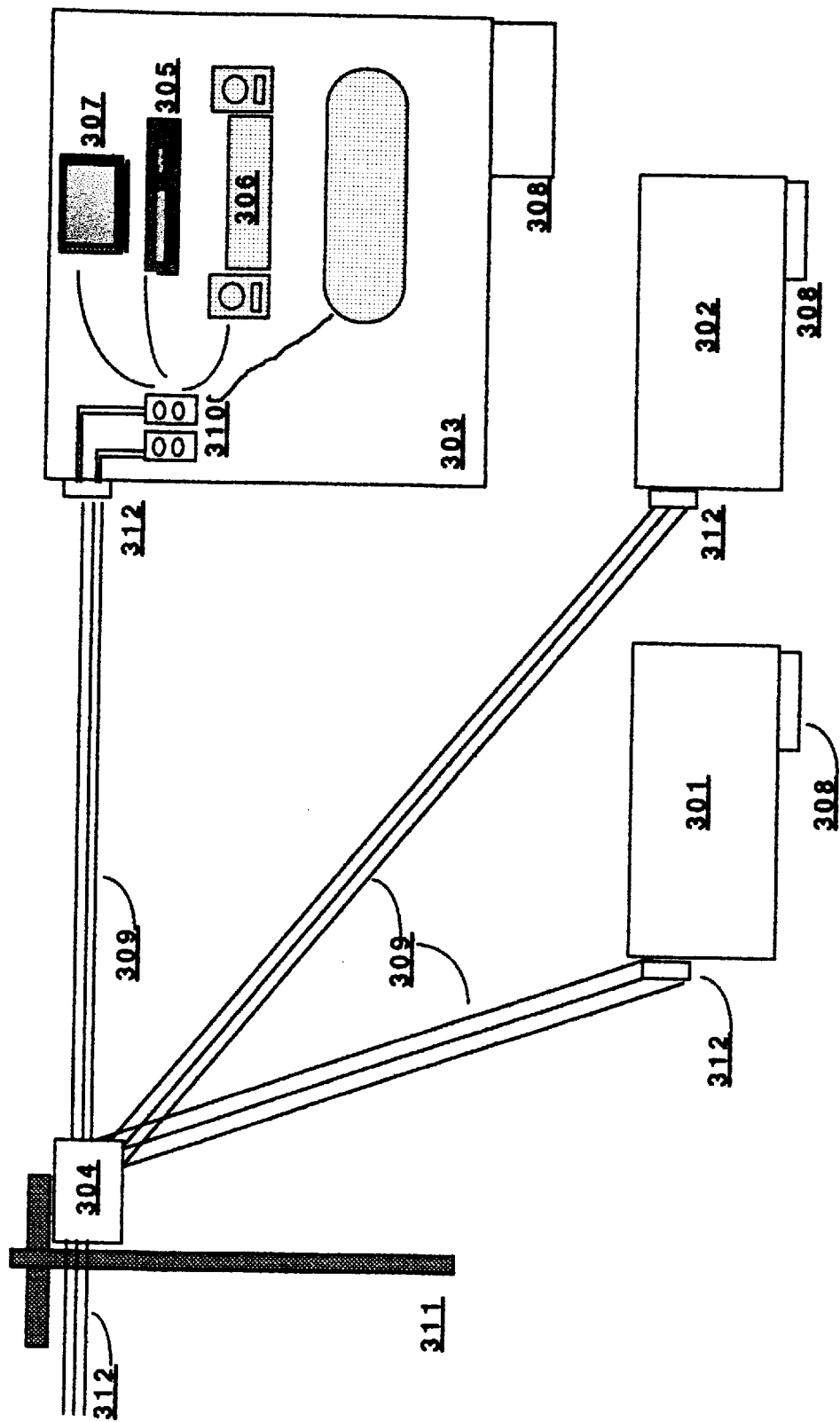

SYSTEM WITH CHOKE IN PARALLEL WITH A/C POWER LINE FOR LOAD CONDITIONING

REFERENCE TO RELATED APPLICATION

This application is based on the provisional patent application filed on Nov. 20, 1998 as Ser. No. 60/109,337 of the same title and inventor, the priority of which is claimed.

TECHNICAL FIELD

The present invention relates to an electrical system for improving the quality of electrical power that is fed into electronic or other electrical equipment or into electrical or electronic components within electronic or electrical equipment. More particularly, the present invention is directed in general to usage on A/C operated devices, preferably audio power amplifiers and preampli-fiers, televisions (TVs), computers, computer peripherals, electrical motors, air conditioners or other appliances, major and minor, and other such electronic and electrical equipment, but not limited to them exclusively. The present invention provides an effective interface for coupling electronic and other electrical components to the A/C line, effectively placing the electric utility transformer closer (from an electrical stand-point) to the electrical or electronic equipment receiving the A/C power. The invention further provides a quenching effect on line noise being produced by the equipment itself, which might effect other equipment sharing the same A/C power, and provides a relatively high current source and stores energy for, for example, power-hungry transients required by, for example, large power amplifiers in audio sound equipment and the like, without any of the "trade-offs" of traditional power line conditioners.

BACKGROUND ART

A listing of prior patents, known to the inventor and which may be relevant to the invention, is presented below:

| Patent No. | Patentee(s) | Issue Date |
|---|---|---|
| 4,218,660 | Carver | 08/19/80 |
| 4,445,095 | Carver | 04/24/84 |
| 4,484,150 | Carver | 11/20/84 |
| 4,517,528 | Tanaka, et al | 05/14/85 |
| 4,586,002 | Carver | 04/29/86 |
| 4,594,561 | Grodinsky, et al | 06/10/86 |
| 4,769,615 | Liberman | 09/06/88 |
| 4,808,946 | Carver | 02/28/89 |
| 5,164,991 | Johnson, et al | 11/17/92 |

These patents generally are directed to audio amplifiers with transformer couplings, a completely different approach than that of the present invention which places an appropriate "choke" coil in parallel with the A/C power line, that is, across the A/C's "hot" and "common" or "neutral" lines.

The present invention is directed in general to usage in connection with A/C operated, electric or electronic equipment, preferably, for example, audio power amplifiers and preamplifiers, televisions, computers, computer peripherals, and other such electronic component equipment or other electrical equipment or devices, for example, electrical motors, air conditioners and other major and minor appliances, but the principles of the invention are even more broadly applicable.

It is noted that power amplifiers (and other high transient demand loads) and preamplifiers when providing an output signal to either the speaker (in the case of a power amplifier) or power amplifier (in the case of the preamplifier) tend to produce an undesirable, much smaller mirror image of the signal they are processing that modulates the A/C line source.

As an effective cure to this problem the parallel choke approach of the invention, due to the fact that it must be magnetically charged by electricity [either from the A/C line or back electromotive force (emf) from it's load] tends to have a reversing effect on this signal, preventing, eliminating or at least substantially reducing it's presence on the A/C line, thereby providing a greatly enhanced A/C power line signal for the load. Without the choke of the present invention, the otherwise untreated signals are able to modulate the A/C line, as it is resistive (basically a wire going from the utility services transformer to the wall outlet that the load(s) is plugged in to).

Up to now, with very few exceptions, virtually all line conditioners have been a major compromise when used in a line enhancement mode. They will in most cases remove small amounts of line noise generated on a given line by such things as motor starting, small transient disturbances and rarely radio frequency (RF) interference imposed on the line. They do this typically by placing small capacitors and air core or ferrite core chokes in series with the line, along with, for example, a metal oxide varistor (for surge suppression). This provides a low cost (high profit) solution to a very small problem.

In the last few years, research has shown that line borne interference is not the major cause of problems in, for example, audio systems. Further research has shown this to be true of other types of applications as well. It has been found that the equivalent series resistance (ESR) of the line is as critical as it would be in capacitive applications. This ESR is greatly aggravated by the majority of line conditioners, as they place resistive elements in series with the source and the load (the wall outlet and the amplifier). As such, when an amplifier hook-up attempts to produce an audio signal, it must discharge the capacitors contained in its power supply into the speakers. This audio signal is then used to modulate the speakers.

But, if one considers basic physics—for every action, there is an equal and opposite reaction. In the case of an amplifier, the opposite reaction is the modulation of the power supply. No matter how large the power supply is, this modulation is unavoidable. In other words, part of the audio signal is imposed upon the line feeding the amplifier. This signal is then imposed upon other pieces of equipment in the system as well. Isolation transformers cannot stop this type of modulation, as they generally are barely large enough to keep up with the load they are supplying.

Now taking this analysis a few steps further, one should consider the amplifier as a large electric motor. When it tries to start, it produces a significant inverse transient on the line. As it spins up, this load lessens and the line then regains its amplitude. In the case of an electric motor, full rotor speed is (crudely put) the same as an amplifier idling, waiting for a signal. As the load engages the motor, it tends to become a greater load to the line and demands more current. As the audio signal is amplified by an amplifier, its power transformer becomes more of a load, and, therefore, places more of a load on the line.

To make matters worse, while the amplifier is struggling to deal with a resistive line and the further added resistance of any kind of line conditioner placed between it and the A/C receptacle, it is being subjected to all of the other components'noises as well. To give an example of this, consider that a CD player is infusing various kinds of high frequency noise generated by its internal clock, as well as its processing circuitry. A VCR is as guilty as the CD player, as it probably uses a switch mode power supply and plenty of digital processing as well. If one is using a surround sound receiver and a television, the amount of noise is compounded in a source-by-source fashion.

It should be kept in mind that a prior art line conditioner does little or nothing to correct this kind of problem, and, as stated earlier, usually adds to the problem.

The present invention does much in the way of removing the effects of these problems. The exemplary embodiment herein actually provides a transient power supply when the need arises, as well as a blocking effect to the problems that are caused by the operation of electrical devices. It should be understood that, unlike power conditioning units and any transformer coil(s) used therein, the coil used in the present invention is not in series with the A/C line but rather in parallel across the line.

Once one or multiple "choke coil" units is cascaded or "piggy-backed" or otherwise installed, the exemplary embodiment of the present invention effectively removes much of the problems caused by the ESR in the line and quenches much of the noise produced by the rest of the equipment as well. Bass becomes much clearer, imaging is improved, the color becoming richer and more life-like. In apartment buildings where electrical loading is a serious problem, as well as older houses that have marginal power connections, the exemplary embodiment of the present invention will have an even more dramatic effect.

With respect to computers and their peripherals, particularly a high usage piece such as a laser printer that tends to produce problems when the fuser comes on or such as a copy machine that does essentially the same thing, the exemplary embodiment of the present invention make a great difference.

It should be understood that, although the foregoing analysis is directed primarily to audio equipment and the like, as an exemplary application, the benefits are similar in many other electrical/electronic applications.

GENERAL SUMMARY DISCUSSION OF INVENTION

Thus, the choke of the present invention, when placed in parallel with the A/C line as taught herein, provides a means of quenching the reflected signal (or back emf) that is developed when any power amplifier or other load places it's demands upon the incoming A/C power line. It also, due to the electromagnetic characteristics of the choke, tends to provide a momentary high current source of energy when needed by, for example, a power amplifier (or other appropriate load) when transient demand is called for.

The preferred approach of the present invention places an appropriate "choke" coil in parallel with the A/C power line, that is, preferably directly across the A/C's "hot" and "common" lines.

The present invention provides an effective interface coupling electronic components to the A/C line, effectively placing the electric utility transformer "physically closer" (in an electrical sense) to the electronic equipment, substantially improving the quality of electrical signal the electrical or electronic components "see". The invention further provides a quenching effect on line noise being produced by the equipment itself and also provides a relatively high current source and stores energy for power-hungry transients required by, for example, large power amplifiers in audio sound equipment and the like, without any of the "trade-offs" of traditional power line conditioners.

A review of the following will provide further clarifying information on the invention and its workings or mode of operation.

Improvements to Television Pictures

A television is probably one of the most complex loads an average consumer will ever place upon an A/C power line.

The modem television, compared with the older types of TVs, contain much more active circuitry. Technicians are constantly confronted with the statement:

"my old set lasted a lot longer and gave me no trouble. Why do I have more trouble with these newer sets?"

If one considers what is going on in the new televisions, then one better understands, not only why new TVs break more often, but why the new (as well as the old) can benefit from the present invention.

Without the use of the present invention, a new, full feature television is a very complex load. When the set is "off" or in "standby", as the state most of the newer sets resort to when they are turned "off", typically the primary, if not only, circuitry operating is a small on-board computer, a switched mode power supply and, in some cases, a few relays that are used to select input functions.

Thus, this "standby" situation alone can impose a signal upon the A/C power line. The TV's power supply is operating at minimum duty cycle, it's switching pulses are short in duration. The computer has it's clock operating and is awaiting commands. This provides at least two signals which are imposed upon the A/C power line even when the TV is "off". So much for the diligent audiophile who turns his/her television "off"(standby) before listening, thinking that all interfering or line disturbing signals from the TV are "off".

One should then also consider what occurs when the television is turned "on", and, for example, the associated home theater is completely engaged. First, the main oscillator is activated by the on-board computer. This excites the horizontal circuitry, which is used to produce not only the high voltage and high amplitude waveforms that are needed for CRT scanning, but also the scan type power supplies used to power the other circuitry. Vertical sweep is now started, usually provided by a master oscillator divided by other circuitry and then amplified by a small power amplifier, which is then coupled to the deflection circuitry.

While all this occurs, color circuitry is operating, as well as video and the delay circuitry. Audio, usually treated as a "stepchild," is also brought on at this point, or as soon as a signal is detected from the tuner and mute is released.

As the television reaches full function, all of the circuitry just discussed is now imposing it's noise upon the main power supply, and it, in turn, places it's noise and all the rest (in smaller amounts) also upon the A/C power line, which, of course, is servicing other electrical loads and electronic components.

The "surround sound" decoder, line doubler (in the case of big screen types) and all of the associated audio support pieces likewise all have their signals imposed on the A/C power line. This can, in some cases, actually become noticeable in the degraded quality of the audio and picture that the system can produce.

Effects of the Present Invention

The present invention can effectively prevent the components from cross-talking on the A/C power line. Not only do all the components benefit from the reduction of this crosstalk, but the power supplies on all of the associated equipment perform more effectively and efficiently. The lost signal (i.e., lost in the line and confused with other signals) is now presented to the viewer in dramatic fashion. The color is truer, as well as the overall detailing of the picture is improved.

Test demonstrations on lower-end televisions with an embodiment of the present invention showed that the invention provided dramatic effects, as well as when used on high end and projection type television.

It is noted that, because the main A/C supply is simply an error corrected type of supply, the error must actually be present long enough for the error correction circuitry to detect and process the information, this being controlled by the time constant of the feedback loop contained in the power supply. Before the correction can occur, the signal that is creating the error is passed along to the capacitor supply that resides in the main supply, this capacitor being depleted of a good deal of it's charge before the duty cycle of the power can correct for this.

Without the present invention, the horizontal sweep frequency, (which appears as an error to the main A/C supply under high demand, as described earlier), the main power supply switching frequency and the variation of its duty cycle as it tries to correct for the added load from a bright scene (also described earlier) are now all passed along to the primary power source, namely, the A/C line. Once the television returns to a more average type of picture, the power supply once again passes errors along to the A/C power line.

Since the power supply is working at an increased duty cycle, once the load on it is reduced, the error correcting circuit must once again detect the lessening of the load and compensate for it. This is passed on to the line also, but as a momentary lessening of the load or an inverse fingerprint.

Once the embodiment of the present invention is installed on the A/C power input line, these "fingerprints" are greatly reduced. Also, the main power supply has a greater amount of energy to draw from, thus aiding in reducing the errors passed through the power supply, giving the error correction circuitry much less work to do. (It should be remembered that, if the signal is imposed upon the line, the power supply must work to compensate for it, as well as the primary error or "demand " imposed upon it.)

The more of today's components (e.g., line doublers, super tube and big screen televisions, high resolution and multi-function VCR's, high power audio amplifiers, surround sound decoders, laser disk and DVD, remote controlled pre-amps, cable and satellite receivers, etc.) that are installed in homes and business, the more the present invention becomes a necessity. Since all of these products all produce their own electrical "fingerprint," a line supply that is resistive like that found in most homes is quite ineffective. As the line is further worsened by many of the "line conditioners" that abound on the present market, these fingerprints become more and more evident.

The preferred embodiment of the present invention effectively removes or quenches most of the signals modulating the A/C power line, as well as providing a very high short term type of power supply for the more demanding of those components.

In the case of the larger screen televisions, a bright scene will usually place quite a demand upon the power supply, as well as the high voltage supply. Since the high voltage supply is operated as a form of switched mode supply and under a heavy load, it passes its demands along to the main supply, and it too, in many cases, is another form of switched mode power supply.

Considering that as the main supply is simply a error corrected type of supply, the error must actually be present long enough for the error correction circuitry to detect and process the information, this being controlled by the time constant of the feedback loop contained in the power supply. Before the correction can occur, the signal that is creating the error is passed along to the capacitor supply that resides in the main supply, this capacitor being depleted of a good deal of it's charge before the duty cycle of the power can correct for the error.

Without the present invention, the horizontal sweep frequency, (which appears as an error to the main supply when high demand, as described earlier) the main power supply switching frequency and the variation of it duty cycle as it tries to correct for the added load from a bright scene (also described earlier) are now all passed along to the primary power source, namely, the A/C line. Once the television returns to a more average type of picture, the power supply once again passes errors along to the A/C line. Since the power supply is working at an increased duty cycle, once the load on it is reduced, the error correcting circuit must once again detect the lessening of the load and compensate for it. This is passed on to the line also, but as a momentary lessening of the load or an inverse fingerprint.

Once the preferred embodiment of the present invention is installed on the line, these "fingerprints" are greatly reduced, also, the main power supply has a greater amount of energy to draw from, thus aiding in reducing in the errors passed through the power supply, giving the error correction circuitry much less work to do.

All of this only explains the horizontal sweep demands and its problems with operating on an adequate A/C line. As the line becomes more and more poisoned by the resistance within it enabling the modulation of itself by the loads imposed upon it, one must consider the effects of having an entire audio/video home theater and possibly other loads (air conditioning, etc.) upon the line as well.

BRIEF DESCRIPTION OF DRAWINGS

For a further understanding of the nature and objects of the present invention, reference should be had to the following description, taken in conjunction with the accompanying drawings, in which like reference numbers are used and wherein.

EXEMPLARY MODES FOR CARRYING OUT THE INVENTION

Figure 1:
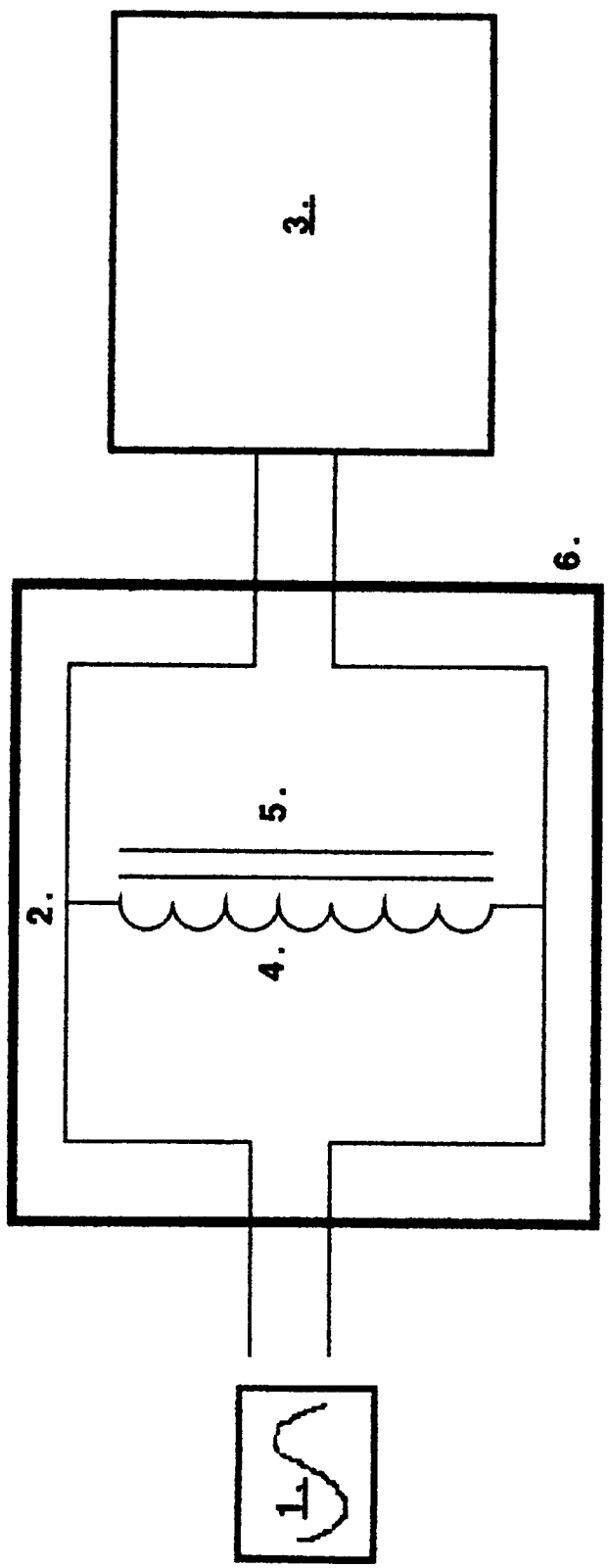
FIG. 1 is a schematic of an initial, exemplary, simplified embodiment of the present invention, showing its very basic elements and the system's imposition between and interconnection to the A/C power line and the load for which the A/C power is being treated by the invention.

As can be seen in FIG. 1, the simplified embodiment of the choke system 10 of the present invention, when placed in parallel with the A/C line 1, provides a means of quenching the reflected signal (or back emf) that is developed when any power amplifier or other like load places it's demands upon the A/C line. It also, due to the electromagnetic characteristics of the choke 2 (having, for example, an iron core), tends to provide a momentary high current source of energy when needed by a power amplifier (or load) 3 when transient demand is called for.

An exemplary load 3 comprises, for example and preferably, an audio, "hi-fi" type component, particularly an audio amplifier or a preamplifier, but the system of the present invention is applicable to many other types of electrical or electronic loads as well.

Power amplifiers (and other transient demand type loads) and preamplifiers, when producing an output signal to either the speakers (in the case of a power amplifier or receiver) or power amplifier (in the case of a preamplifier) tend to produce a much smaller mirror image of the signal the component or equipment 3 is processing that modulates the A/C line source 1. The choke 2 of the invention, due to the fact that it must be magnetically charged by electricity (either from the A/C line 1 or the back emf from its load 3) tends to have a reversing effect on the signal, preventing its presence on the A/C line, thereby providing a greatly enhanced line for the load 3.

Without the choke 2 of the invention, the signals would be able to modulate the A/C line, as it is resistive (basically the resistance of the length of wire extending from the utility services transformer [e.g. the transformer on the electric utility pole outside the residence or other building in which the load is located) to the wall outlet that the load(s) is plugged into].

The choke 2 of the simplified embodiment of the invention of FIG. 1 includes a coil 4 formed, preferably, from is a single winding of copper wire on a "EI" type iron core 5. The choke 2 produces a minimum of, for example, about one (1) henry or greater [most exceeding about three (3) henries].

When placed in parallel to the A/C line source 1 and the load 3, as illustrated, the core 2 becomes magnetized whenever the A/C line voltage is not at the zero volt crossing point. Since the core 2 is not capable of permanent magnetization, it returns to a state of non-magnetization, unless the load 3 is providing a back electromotive force ("back emf") signal to it, therefore enabling it to turn that signal into magnetic energy, as well as reflect the signal back to the source.

The coil 4 preferably is made of copper wire, with a resistance less than, for example, about one hundred (100Ω) ohms (greatly less, for further example, on larger models). The core 2 comprises a standard iron type core, for example, an "EI" core. Alternatively, for further example, a torroidal-type core providing the same properties could be used, among other possible type of cores. The core 2 is laminated, with each core element (in the "EI" type) extending around the coil to provide for enhanced magnetization of the core 5. Typically the choke 2 would be housed in an appropriate housing 6 (note phantom lines).

Figure 2:
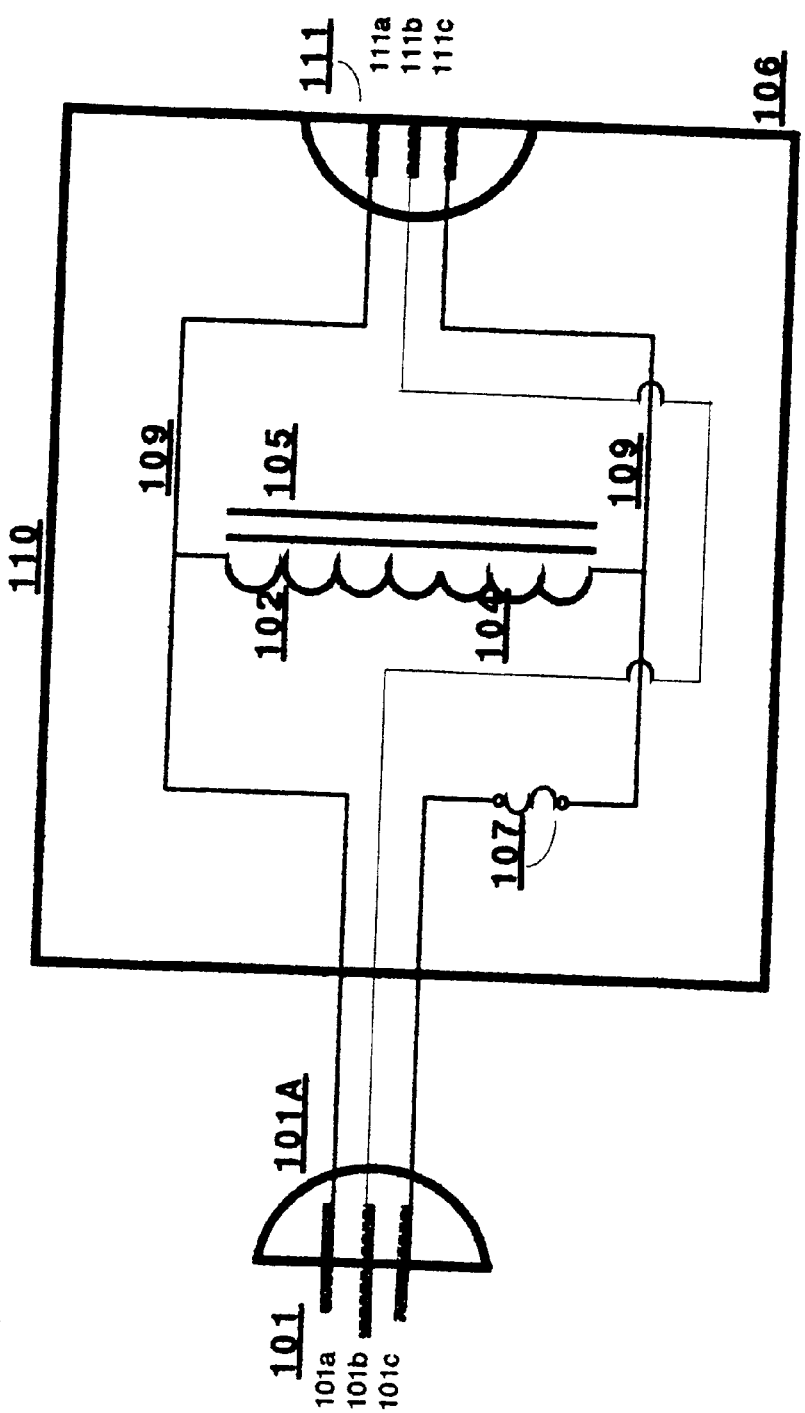
FIG. 2 is schematic of a second embodiment very similar to the simplified one of FIG. 1 but with supplemental, interconnect elements separately housed for connecting the embodiment of the invention between an exemplary, separate electrical or electronic piece of equipment (e.g. an audio amplifier or preamplifier) and the electrical utility's A/C power line as it typically exists in a house or other building.

With reference to FIG. 2, the basic elements (2→102, 4→104 & 5→105) of the basic embodiment of FIG. 1 are included in a housing 106, which housing includes a cord with a standard type, three (3) prong (common, hot & ground), A/C power plug 101' at its end, for plugging the system 110 into a standard, A/C power wall socket 101 (well known and not illustrated for simplicity purposes). An internal, protective fuse 107 is included, while on the other side of the housing 106 there is included a three (3) prong (common or neutral, hot & ground) A/C receptacle or socket 108, into which the electrical or electronic load 103 is plugged via a standard-type, three (3) prong, A/C plug. Appropriate, interconnecting wiring is provided as schematically illustrated in FIG. 2.

Figure 3:
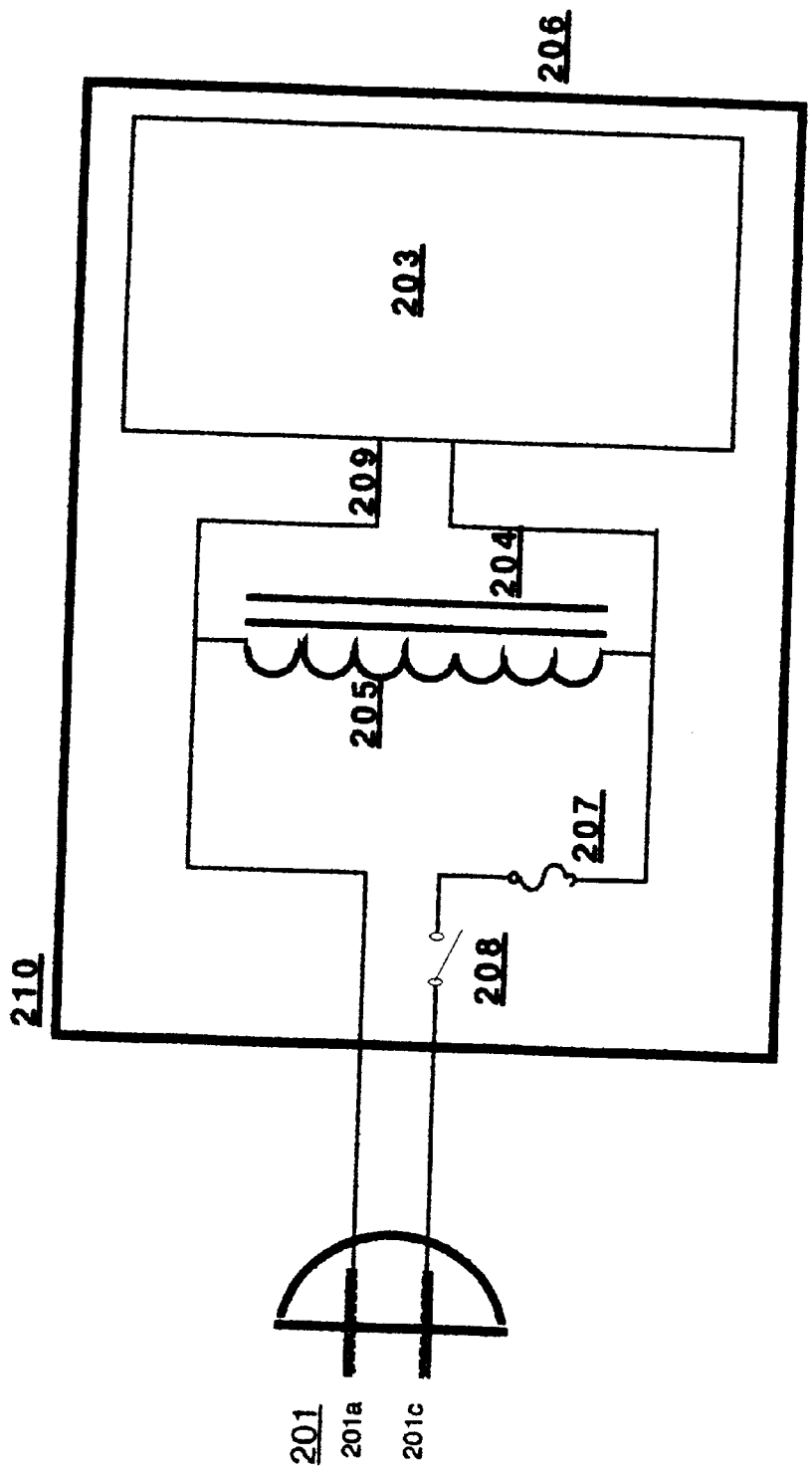
FIG. 3 is schematic of a third embodiment, similar to that of FIG. 2, but with the basic elements of the embodiment commonly housed with the exemplary electrical or electronic components (e.g. an audio amplifier or preamplifier) in the same housing, i.e. structurally integrated with the components in physically the same, common housing.

Now with reference to FIG. 3, the basic choke elements (2→202, 4→204 & 5→205) of the basic embodiment of FIG. 1, in similar fashion to that of FIG. 2, are included in a housing 206, but in this instance the housing is the same one housing the electrical or electronic load components 201 (e.g., the components of an amplifier, preamplifier, TV, CD player, computer, computer peripheral, etc.), that is the components 203 and the choke 202 are structurally integrated together within a common or combined housing having a cord with a standard type, three (3) prong (common, hot & ground), A/C power plug 201' at its end, for plugging the system 210 into a standard, A/C power wall socket 201 (well known and not illustrated for simplicity purposes). An internal, protective fuse 207, along with an "on/off" switch 208. Because of the common housing integration of the choke 202 and the load components 203, no A/C plug/socket interconnect between them is necessary.

Appropriate, interconnecting wiring is provided as schematically illustrated in FIG. 3, including the core/component interconnecting wires 209 which in essence serve as the A/C power input to the component's electronics 203 comparable to the interconnecting wires 109 of FIG. 2. Thus, it should be understood that the choke 2/102/202 is placed across the wiring lines 9/109/209, respectively, in parallel with the incoming A/C power lines 1/101/201 (hot to hot, common to common), respectively.

As generally noted above, the exemplary system 10/110/210 of the present invention provides an effective interface, coupling electronic components to the A/C line 1/101/201, effectively placing the electric utility transformer "physically closer" (in an electrical sense) to the electric or electronic equipment or components 3/103/203 involved, substantially improving the quality of the electrical signal that the electrical or electronic components of the equipment actually "see". The exemplary system 10/110/210 further provides a quenching effect on line noise being produced by the equipment or interconnected components itself/themselves and also provides a relatively high current source and stores energy for power-hungry transients required by, for example, large power amplifiers in audio sound equipment and the like, without any of the "trade-offs" of traditional power line conditioners.

As noted above, FIG. 4A is a generalized, schematic illustration of exemplary homes 301, 302 & 303 in an exemplary neighborhood 300 connected into and being driven by a utility power transformer 304 exemplifying a typical neighborhood situation, with the third home 303 showing an exemplary room 305 with exemplary A/C electrically powered home entertainment components, including audio equipment 306 and TV 307, and an air conditioner ("A/C") 308, as exemplary (but hardly exhaustive) electrical device load applications for the exemplary embodiments described above with reference to FIGS. 1–3.

Figure 4B:
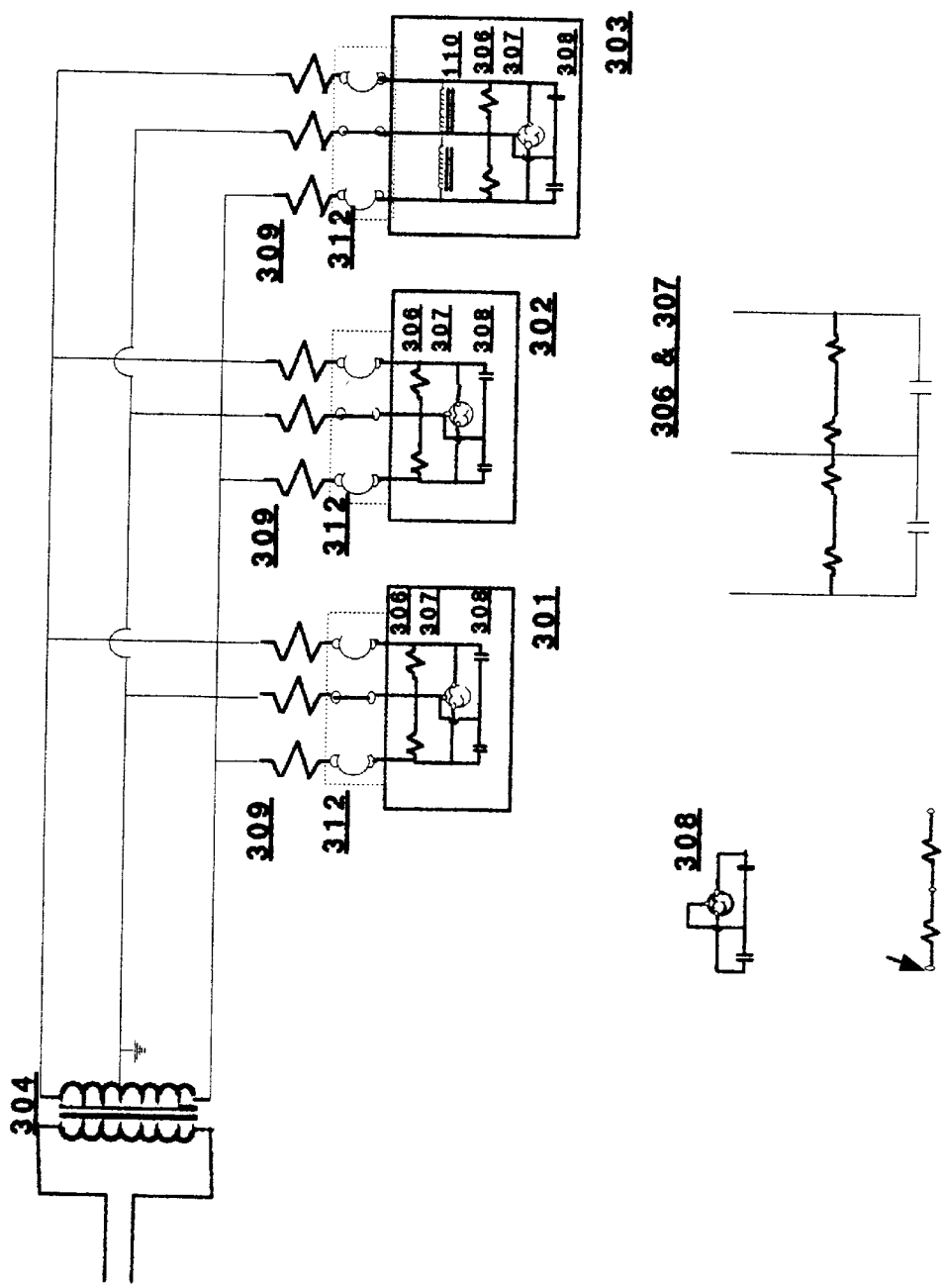
FIG. 4A is a generalized, schematic illustration of exemplary homes electrically connected to a exemplary power transformer exemplifying a typical neighborhood situation, with the third home showing an exemplary room with A/C electrically powered home entertainment components, including audio equipment and TV and an air conditioner ("A/C") as exemplary electrical device loads; while FIG. 4B generally illustrates in schematic form the basic circuitry or electrical equivalence of the "neighborhood" example of FIG. 4A.

The components 306/307 are plugged into standard A/C, three prong, one hundred and ten (110v) volt, A/C wall outlets 310, while the air conditioner 308 is directly wired into the A/C house wiring, usually through a breaker or fuse box (not illustrated but well known in the house wiring electrical art), off of, for example, the combined two hundred and twenty (220v) volt lines, using both "hot" lines as illustrated in FIG. 4B. The distance between the utility power transformer 304 and the wall outlet 310, measured by the total amount of wire electrically between them, varies greatly, but typically there is a significant distance of the order of at least about fifty (50') feet between the power transformer and the electrical device load, and sometime substantially more. The choke coil 110 substantially reduces, if not eliminates, the resistive effects of the combined wiring between the electrical device load (e.g., components & air conditioner 306–308) and the transformer 304.

Thus, as can be seen in the generalized illustration, an exemplary neighborhood 300 includes a number of homes [an exemplary three (3) homes being shown for general illustrative purposes], with, as is well known, the home service wires 309 going from a utility transformer 304 on a power pole 311 (or other ground-type transformer) fed by the power transmission lines 312. The service wires 309 terminate in one or more metered breaker boxes 312, from which the house wiring extends to the exemplary wall outlets 310 for plugging in, as may be desired by the home occupants, various electrical components, appliances and the like, such, as for example, the home entertainment audio components 306 and TV 307 generally illustrated. In the use of the present invention for a situation such as that illustrated in the room 305, the exemplary embodiment 110 of FIG. 2 is plugged directly into the A/C wall box 310 using the wall plug 101 with, for example, the audio components 306 and TV 307 plugged directly into the receptacle(s) 103 of the unit 110 rather than in the wall plug 310.

FIG. 4B generally illustrates in schematic form the basic circuitry or electrical equivalence of the "neighborhood" example of FIG. 4A and like reference numbers are used in both illustrations. However, for further illustrative purposes, two "Power Company"™ units 110 of the invention are used along side each other, each being plugged into the wall outlet in house 303 with the audio components 306, TV 307 and air conditioning unit 308 are plugged into it, allowing them to enjoy the high quality A/C input power provided by the invention; while in the first two houses 301 & 302 the components, TV and air conditioning unit are plugged directly into the house wiring subject to all of the A/C power input problems discussed above.

Contrary to accepted doctrine, the inventor has found that the A/C line feed from the utility transformer 304 to a good, high current, moderately clean source of power. The use of the present invention effectively allows the user's components and electrical devices and appliances to see the same type of high quality, A/C input power they would "see" if they were in essence directly connected to the standard side of the utility transformer 304. The invention's great reduction, if not elimination, of the effective resistance of the wire from the transformer 304 to the components, etc., including the service wires 309 and the subsequent house wiring, and its great reduction, if not elimination, of equipment cross-talk, while providing an instant high current source for the components, etc., enables the components, etc., to operate in many instances at their maximum performance levels. The invention, in it preferred embodiment, essentially does much to remove the effects of resistance in the line.

The current, most recent exemplary embodiment of the invention, of the type of FIG. 1 and of the form shown in FIG. 2, included a coil 4/102 wound on a, for example, one and five-eights by one and five-eights (1⅝"×1⅝") inch coil form made from, for example, a Kraft paper material, with the coil including, for example, thirteen hundred and ten (1,310) turns of, for example, a nineteen (#19) gauge awg. copper magnet wire (e.g NEMA MW-28). The layer insulation used between the layers of magnet wire was, for example, seven (7) mil. fiber. The lamination core 5 was, for example, IE-162 with, for example, a one and five-eights (1⅝") inch center leg width lamination of, for example, twenty-six (#26) gauge M50 grade, made to a stack dimension of one and five-eights (1⅝") inches.

These exemplary dimension and exemplary materials are, of course, subject to great variation.

It is noted that the embodiments described herein in detail for exemplary purposes are, of course, subject to many different variations in structure, design, application and methodology. Because many varying and different embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense.

What is claimed is:

1. In an alternating current (A/C), electrical powered system, including an incoming A/C power source line having at least three conductors, a "ground" line conductor, a "neutral" line conductor and a "hot" line conductor, powering at least one electrical device load, the improvement comprising:

an electrical choke coil placed in parallel with the A/C source line, across the A/C power source line's "hot" and "neutral" line conductors between the electrical device load and the A/C power source line, quenching the reflected back emf signal that develops when the electrical device load places its demands upon the incoming A/C power source line.

2. The improvement of claim 1, wherein:

the load is located in a building having internal, A/C electrical wiring; and wherein there is further included:

a utility power transformer, with the A/C power source line being connected to the power transformer and being driven by the power transformer to produce the A/C on the power source line; and wherein:

there is a significant distance of the order of at least about fifty (50") feet between the power transformer and the electrical device load;

said choke coil substantially reducing, if not eliminating, the resistive effects of the wiring between the electrical device load and the power transformer.

3. The improvement of claim 1, wherein:

said choke coil is contained in a separate housing, with a wired A/C plug extending out of one side connected to the A/C power line source through a wall socket, and with an A/C socket being located on an exterior surface of said housing, the electrical device load being plugged into said A/C socket.

4. The improvement of claim 1, wherein:

the device load includes a housing, said choke coil being contained in said housing.

5. The improvement of claim 1, wherein:

said choke coil is greater than about three (3) henries.

6. The improvement of claim 1, wherein:

said choke coil has a "EI" core.

7. The improvement of claim 1, wherein:

said choke coil has a torroidal-type core.

8. A method of improving the quality of A/C power input to an electrical device load being powered from an A/C power source line having at least three conductors, a "ground" line conductor, a "neutral" line conductor and a "hot" line conductor, comprising the following step:

placing an electrical choke coil in parallel with the A/C power source line, across the A/C power source line's "hot" and "neutral" line conductors between the electrical device load and the A/C power source line, quenching the reflected back "emf" that develops when the electrical device load places its demands upon the incoming A/C power source line.

9. The method of claim 8, wherein the electrical device load is located in a building having internal, A/C electrical wiring, there is further included a utility power transformer, with the A/C power source line being connected to the power transformer and being driven by the power transformer to produce the A/C on the power source line, there being a significant distance of the order of at least about fifty (50') feet between the power transformer and the electrical device load; wherein there is further included the step of:

using said choke coil to substantially reduce, if not eliminate the resistive effects of the wiring between the electrical device load and the power transformer.

\* \* \* \* \*